United States Patent
Prothero

(10) Patent No.: US 8,948,278 B2
(45) Date of Patent: *Feb. 3, 2015

(54) TELECOMMUNICATION SIGNALING USING NONLINEAR FUNCTIONS

(71) Applicant: Astrapi Corporation, Washington, DC (US)

(72) Inventor: Jerrold D. Prothero, Washington, DC (US)

(73) Assignee: Astrapi Corporation, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/902,502

(22) Filed: May 24, 2013

(65) Prior Publication Data
US 2013/0251018 A1 Sep. 26, 2013

Related U.S. Application Data

(63) Continuation of application No. 12/852,852, filed on Aug. 9, 2010, now Pat. No. 8,472,534.

(60) Provisional application No. 61/288,564, filed on Dec. 21, 2009.

(51) Int. Cl.
*H04L 27/00* (2006.01)
*H04L 27/34* (2006.01)

(52) U.S. Cl.
CPC .................. *H04L 27/3405* (2013.01)
USPC .......................... 375/259; 375/356

(58) Field of Classification Search
USPC ................. 375/259, 356, 219–222
See application file for complete search history.

(56) References Cited

U.S. PATENT DOCUMENTS

| | | | |
|---|---|---|---|
| 5,532,595 A | 7/1996 | Lampman et al. | |
| 5,920,238 A | 7/1999 | Cairns | |
| 6,155,980 A * | 12/2000 | Chiao et al. | 600/447 |
| 6,318,179 B1 * | 11/2001 | Hamilton et al. | 73/606 |
| 8,472,534 B2 * | 6/2013 | Prothero | 375/259 |
| 2002/0015212 A1 * | 2/2002 | Fujiwara et al. | 359/238 |
| 2003/0067990 A1 | 4/2003 | Bryant | |
| 2003/0206578 A1 | 11/2003 | Betts | |
| 2006/0039455 A1 | 2/2006 | Cairns et al. | |
| 2006/0067422 A1 | 3/2006 | Chung | |
| 2006/0170930 A1 | 8/2006 | Li | |
| 2007/0195952 A1 | 8/2007 | Singanamala | |
| 2008/0095121 A1 | 4/2008 | Shattil | |
| 2008/0130714 A1 | 6/2008 | Wilborn et al. | |

OTHER PUBLICATIONS

J.D. Prothero (2007), Euler's Formula for Fractional Powers of i. Available at http//www.scribd.com/doc/7127722/Eulers-Formular-for-Franctional-Powers-of-i.

International Search Report dated Mar. 29, 2011, as issued in corresponding International Patent Application No. PCT/US2010/058748, 5 pages.

* cited by examiner

*Primary Examiner* — Emmanuel Bayard
(74) *Attorney, Agent, or Firm* — Maier & Maier, PLLC

(57) ABSTRACT

One exemplary embodiment can describe a method for communicating. The method for communicating can include a step for identifying characteristics of a communications channel, a step for identifying a set of nonlinear functions used to generate waveforms, a step for assigning a unique numeric code to each waveform, a step for transmitting a numeric sequence as a series of waveforms, a step for receiving the series of waveforms, and a step for decoding the series of waveforms.

20 Claims, 5 Drawing Sheets

400

| Range of m | Sign of $\cos(2^{1-m}\pi)$ | Sign of $\sin(2^{1-m}\pi)$ | Description of spiral |
|---|---|---|---|
| $2 - \log_b(3) > m > 0$ | Positive | Negative | Increasing, rotating clockwise |
| $1 > m > 2 - \log_b(3)$ | Negative | Negative | Shrinking, rotating clockwise |
| $2 > m > 1$ | Negative | Positive | Shrinking, rotating counter-clockwise |
| $m > 2$ | Positive | Positive | Increasing, rotating counter-clockwise |

…

TELECOMMUNICATION SIGNALING USING NONLINEAR FUNCTIONS

RELATED APPLICATIONS

This application is a continuation to U.S. patent application Ser. No. 12/852,852, filed Aug. 9, 2010, which claims priority to U.S. Provisional Patent Application No. 61/288,564, filed Dec. 21, 2009 and entitled INTEGRATED ANALOG DIGITAL: THE APPLICATION OF NON-LINEAR FUNCTIONS TO TELECOMMUNICATIONS, the entire contents of which are hereby incorporated by reference.

BACKGROUND

Telecommunications signaling practice falls generally into two categories. The first category, digital communication, encodes signals into a series of discrete pulses. The second category, analog communication, is based on modulating a continuous (generally sinusoidal) carrier wave in some way: for example, a signal can be stored in an amplitude modulation to the carrier wave (AM), or in a frequency modulation to the carrier wave (FM).

There is a combination of digital and analog techniques: digital Quadrature Amplitude Modulation (QAM), which conveys a data stream through discrete amplitude modulation of two carrier sine waves 90 degrees out of phase with each other. Euler's formula, which generates the sine and cosine waves, is the basis for most current analog communication techniques, including QAM.

Generally power amplifier architectures trade off efficiency for linearity (e.g., Class A vs. Class D). Consequently, mobile and satellite applications, which need efficient transmission, must use nonlinear amplification techniques. However, for signaling techniques such as QAM to work, amplification should be linear. To overcome such issues, engineers have introduced a multitude of linearization techniques such as pre-distortion, post-distortion, power back-off, feed forward, envelope elimination and restoration, and so forth.

Linear systems may be conceptualized by the whole being the (possibly weighted) sum of the parts, with no need to consider interactions between the parts. Furthermore, standard engineering practice in telecommunications attempts to remove nonlinearity wherever possible. Linear systems are generally easier to design, build and maintain than nonlinear systems. However, the simplicity of linearity comes at a fundamental cost: linear systems are less flexible and therefore less efficient than nonlinear systems. This is why, for example, high performance aircraft such as fighter planes and the Space Shuttle are always highly nonlinear.

Nonlinear efficiency essentially arises from more sophisticated use of available resources. Current telecommunication signaling practice makes simplifying engineering choices that limit performance. For instance, digital pulses control for noise by ignoring all but two amplitude levels, and by making no use of signal shape for signaling purposes. Analog communication (including QAM) is based on a restricted set of manipulations to sine waves.

Furthermore, QAM requires linear power amplification generally due to how QAM signals are generated. Every QAM signal is the linear sum of a cosine and a sine wave of the same frequency but generally different amplitudes. Any such sum is mathematically equivalent to a single sine wave with constant amplitude and shifted phase. Consequently, each QAM signal is inherently and unavoidably transmitted as a sine wave of constant amplitude.

Since nonlinear power amplifiers (NPAs) introduce distortion that varies with amplitude, there is no means to detect, much less correct, such distortion by analyzing signals of constant amplitude. The NPA distortion is mathematically orthogonal to the signal space: no information is shared between them, and hence nothing can be learned of one by studying the other.

Consequently, and despite efforts to compensate for this deficiency, QAM is extremely vulnerable to amplitude distortion. QAM essentially compensates for the lack of varying amplitude information within QAM signals by restricting NPA and separating signals as widely as possible in amplitude space.

Aside from its problems with nonlinear power amplification, another short-coming of QAM is that it is a method based on use of a single frequency: QAM does not make optimal use of the available frequency range. While QAM can be paired with techniques such as Orthogonal Frequency-Division Multiplexing (OFDM) to extend frequency usage, OFDM applied to QAM actually reduces information throughput, rather than increasing it, due to the stringent constraints imposed by signal orthogonality. OFDM is not introduced to improve QAM's efficiency, but rather to compensate for its inherent weaknesses in noise resistance.

SUMMARY

One exemplary embodiment can describe a method for communicating. The method for communicating can include a step for identifying characteristics of a communications channel, a step for identifying a set of nonlinear functions used to generate waveforms, a step for assigning a unique numeric code to each waveform, a step for transmitting a numeric sequence as a series of waveforms, a step for receiving the series of waveforms, and a step for decoding the series of waveforms.

Another exemplary embodiment can describe a communications system. The communications system can include at least a first transceiver containing a first processor that can identify the characteristics of a communication channel, identify a set of nonlinear functions used to generate waveforms, and assign a unique numeric code to each of the waveforms. The first transceiver can transmit a numeric sequence as a series of waveforms. A second transceiver having a second processor can receive the waveforms and the second processor can decode the waveforms.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation. In addition, "wave" should be understood to be the same as "waveform."

Generally referring to exemplary FIGS. 1-5, embodiments described herein may make use of nonlinear functions that generate waveforms with certain qualities. First, the waveforms may be easily distinguishable. Sampling a single point from the waveform generated by a nonlinear function can be sufficient to distinguish it from the other functions in the set. Second, the waveforms may be arbitrarily densely packed. If the channel has very little noise, it may be possible to select nonlinear functions close together to allow more waveforms to fit into the available amplitude and frequency ranges, thereby increasing the information conveyed by each sample. Third, the waveforms may be spread arbitrarily far apart. If the channel has higher noise, it may be possible to spread the nonlinear functions apart such that the waveforms generated can be easier to distinguish. In addition, it may be possible to easily adjust to a nonlinear noise distribution. Fourth, the waveforms may support simple and dynamic adjustment of spacing. It may be possible to easily adjust the distance between the waveforms to precisely match the noise characteristics of the channel, possibly altering the spacing in real-time. Fifth, the waveforms may be generated, transmitted, and received.

Figure 1:
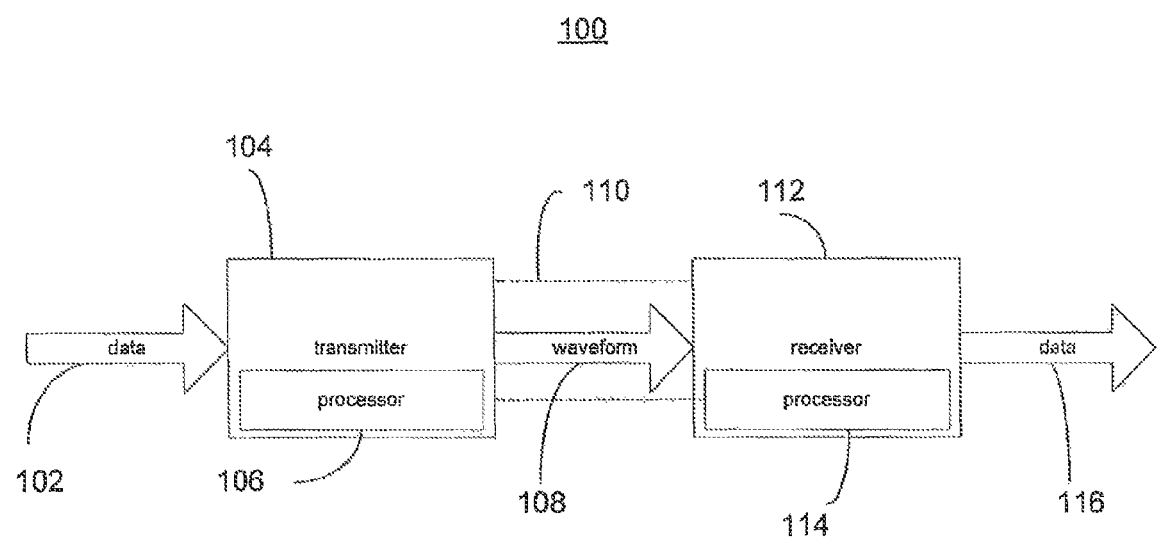
FIG. 1 is an exemplary diagram showing data being transmitted from a transmitter or transceiver to a receiver or transceiver via a waveform.

Generally referring to exemplary FIG. 1, communication 100 may include transmitting data 102 using a transmitter or transceiver 104, which may contain a processor 106 that may select and generate at least one of a set of unique nonlinear functions. The transmitter or transceiver 102 may transmit a waveform 108 through the channel 110. Communication 100 may also include a receiver or transceiver 112, which may also contain a processor 114 that may determine which function or functions were transmitted by possibly receiving a transmitted waveform and possibly decoding the received waveform 108 into data 116.

A measure of communication efficiency involves a determination of how quickly one can distinguish between two or more functions. For example, if a sample can distinguish between two functions, the sample can convey one bit of information. Similarly, if a sample can distinguish between four functions, the sample can convey two bits of information.

The ability to distinguish between signals in a single sample does not violate the Nyquist rate, which sets a lower bound for the sample rate for alias-free signal sampling. The Nyquist rate is a statement about what is required to reconstruct an arbitrary waveform in the absence of any information other than sampling data. Referring to exemplary FIG. 1, the processor 114 of the receiver or transceiver 112 may instead distinguish a signal from a limited set of possible alternatives.

Mathematical theory used to describe embodiments discussed herein was introduced in the inventor's monograph *Euler's Formula for Fractional Powers of i*, which is incorporated herein by reference (J. D. Prothero (2007), *Euler's Formula for Fractional Powers of i* is found at http://www.scribd.com/doc/7127722/Eulers-Formula-for-Fractional-Powers-of-i).

In some exemplary embodiments, a waveform may be generated using the nonlinear equation:

$$f_m(t) = e^{ti\left(2^{(2-m)}\right)}$$

where t and m are real-valued parameters and i is the imaginary constant.

This equation can be written equivalently as:

$$f_m(t) = e^{t \cdot \cos(2^{1-m} \cdot \pi)} \cdot e^{i \cdot t \cdot \sin(2^{1-m} \cdot \pi)}$$

Figure 2:
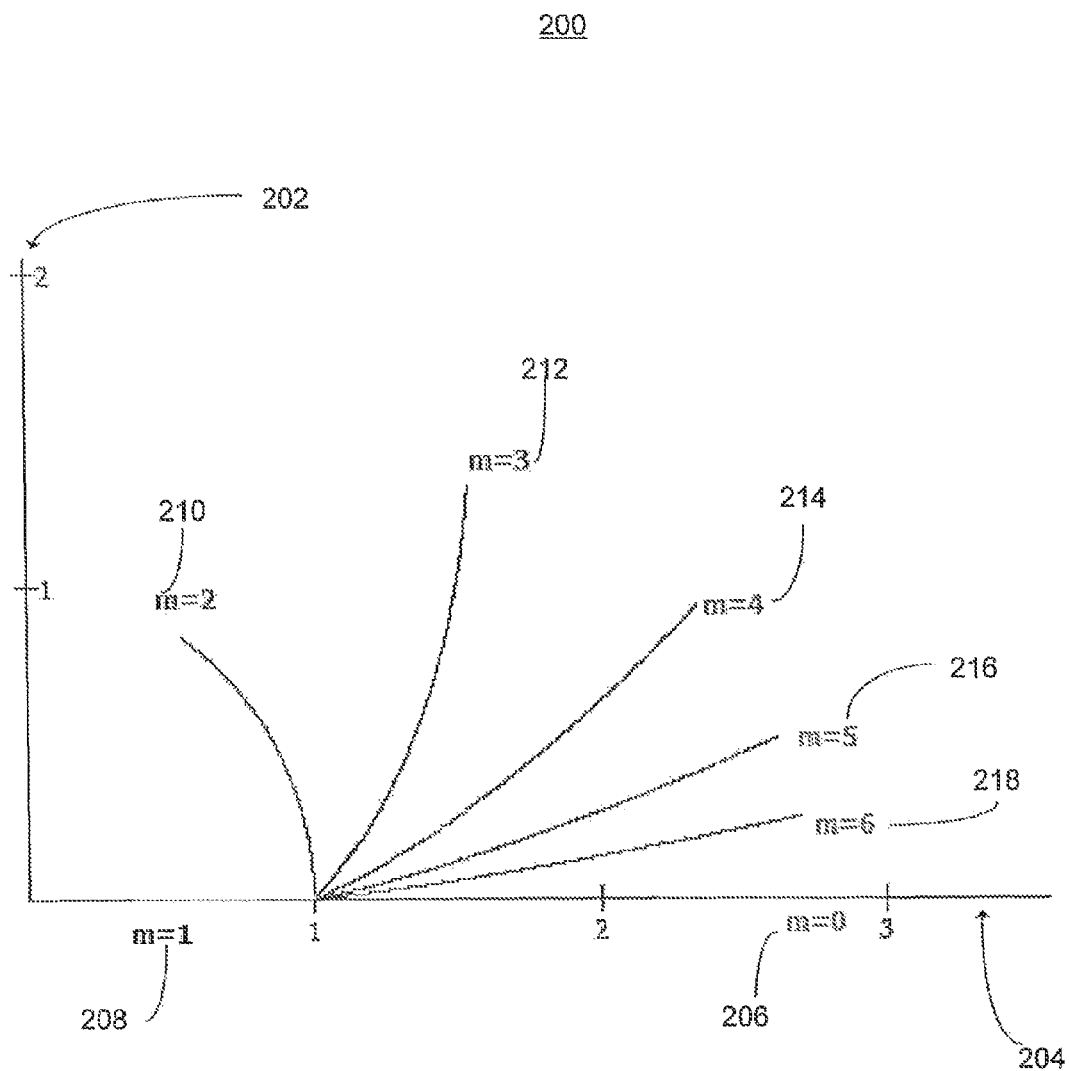
FIG. 2 is an exemplary graph of sample signals produced by a generating equation according to an exemplary embodiment.

In exemplary FIG. 2, the graph 200 contains a real axis 202 and an imaginary axis 204 which form a coordinate system. Referring to exemplary FIG. 2, an integer m≤0 used within the above listed equation may yield $f_0(t)=e^t$ the standard increasing exponential 206. For m=1, $f_1(t)=e^{-t}$ the standard decreasing exponential 208 may result. For m=2, $f_2(t)=e^{it}$ the basis for Euler's formula 210, can result, defining a complex circle. For m=3, $f_3(t)=e^{t/\sqrt{2}} \cdot e^{it/\sqrt{2}}$ results, a spiral in the complex plane 212. For m≥4, complex spirals with increasingly rapid growth and increasingly slow rotation 214 can result. The curve associated with m=5 216 and the curve associated with m=6 218 are additionally depicted in FIG. 2. In the limit as m→∞, the result can converge back to $e^t$. Note that $f_m(0)=1$ for all m.

For use with signal transmission, the equation can further be rewritten in terms of real and imaginary parts as:

$$f_m(t)=e^{t \cdot \cos(2^{1-m} \cdot \pi)} \cdot (\cos(t \cdot \sin(2^{1-m} \cdot \pi))+i \cdot \sin(t \cdot \sin(2^{1-m} \cdot \pi)))$$

As with QAM, it may be possible to unambiguously transmit the real and imaginary parts simultaneously. These parts can also be transmitted separately.

For m>2 and t>0, the set of functions $f_m(t)$ may have the qualities discussed previously.

Still referring to exemplary FIG. 2, For m>2 and t>0, there may be no t such that $f_{m_a}(t)=f_{m_b}(t)$ unless $m_a=m_b$. Consequently, providing $f_m(t)$ for any single value of t>0 may be sufficient to determine m. This also may follow from noticing that $f_m(t)$ defines spirals that lie outside of each other as m increases. Since each spiral lies outside the spiral before it, the spirals may not intersect at the same value of t.

For a particular value of t, the second factor, $e^{i \cdot t \cdot \sin(2^{1-m} \cdot \pi)}$, may define a point on a circle in the complex plane. The first factor, $e^{t \cdot \cos(2^{1-m} \cdot \pi)}$, may define the radius of the circle.

With regard to exemplary FIG. 2, as m increases, each $e^{t \cdot \sin(2^{1-m} \cdot \pi)}$ may define a distinct (and increasing) radius for a particular t. Since the points of $f_m(t)$ lie on circles of different radius for different m, it may not be possible for the curves defined by $f_m(t)$ to intersect at the same value of t.

Consequently, the above may demonstrate that if both the x and y (real and imaginary) parts of $f_m(t)$ are provided, uniqueness may be provided. As a result, the desired quality of the waveforms being distinguishable may be present.

The values of t may range from a minimum value to a maximum value. The maximum t value may be t=T. This maximum value may be different for different waveforms in some embodiments. As can be seen in FIG. 2, because $f_m(0)=1$ for all m, the spirals determined by $f_m(t)$ may be bunched tightly together in the region close to t=0. One may achieve an arbitrarily dense packing by selecting a sufficiently small T>0. The lower the value of T, the more $f_m(t)$ functions can be represented in a given amplitude range and, consequently, a higher communication rate can result. However, dense packing may result in communication errors if the channel noise exceeds the spacing between curves.

Still referring to exemplary FIG. 2, the spacing between the $f_m(t)$ functions can increase exponentially as t increases. One may achieve an arbitrarily large spacing between the $f_m(t)$ by picking a sufficiently large value of t. This may help to mitigate the effects of noise, but at the cost of decreasing the number of functions that can fit in a given amplitude range, and therefore may decrease the communication speed.

Referring back to FIG. 1, one may optimize the waveform 108 for different noise conditions of the channel 110. For instance, if greater noise exists at higher amplitudes, a set of $f_m(t)$, described above, can be selected with a value of T, which may refer to the final value of t for a signal, that may provide greater spacing at higher amplitudes.

Still referring to FIG. 1, exemplary embodiments may make use of repeaters. Repeaters may control for noise due to signal corruption over long transmission distances. Boosting an analog signal may introduce distortion, while a digital signal, read correctly, may be regenerated accurately.

While these embodiments may transmit analog waves, information conveyed by the signal may be a binary sequence tied to the identification of the particular wave. If the wave can be identified, it may be regenerated accurately.

If channel noise or reliability concerns change, the value of T may efficiently be renegotiated between the transmitter or transceiver and the receiver or transceiver during the course of a communication session to match new criteria. It may also be possible to select an entirely new set of functions better suited to the new noise conditions.

The real and complex parts of $f_m(t)$ may each be computed using one exponential function, one cosine or sine function, and multiplication. These are natural operations that are easily and efficiently generated with analog electronic circuits.

If it is desired to avoid multiplication, this may be accomplished using the following identity:

$$e^A B = e^{\ln(e^A B)} = e^{\ln(e^A) + \ln(B)} = e^{A + \ln(B)}$$

This can yield real part:

$$x = e^{t \cdot \cos(2^{1-m} \cdot \pi)} \ln(\cos(t \cdot \sin(2^{1-m} \cdot \pi)))$$

and imaginary part:

$$y = e^{t \cdot \cos(2^{1-m} \cdot \pi)} + \ln(\sin(t \cdot \sin(2^{1-m} \cdot \pi)))$$

As matter of notation, $\{F_j(t)\}$ can be used to denote the particular set of nonlinear signal functions used for a specific communication channel. Here, j may be an integer in the range [0, 1, ... N−1], where N may be the number of functions used for the particular channel and t may be a real-valued parameter. The $\{F_j(t)\}$ for the particular channel can be selected, based on noise and available amplitude range considerations, from the infinite set of possible functions denoted by $\{f_m(t)\}$ introduced above.

In an exemplary embodiment, the first step in a communication strategy for transmitting data, as is generally depicted within FIG. 1, can be to select $\{F_j(t)\}$ and T. The selection of $\{F_j(t)\}$ and T can be based on the consideration of channel characteristics such as noise and available amplitude and frequency range, as well as optimization criteria. The receiver or transceiver 112 and transmitter or transceiver 104 may together make use of a specific $\{F_j(t)\}$ and T. In an exemplary embodiment, the transmitter or transceiver 104 may send electromagnetic waveforms corresponding to the values $\{F_j(t)\}$ between t=0 and t=T. In another embodiment, the starting value of t, $t_s$, may be such that $0 < t_s < T$.

Still referring to FIG. 1, binary codes may be assigned by the processor of the transmitter or transceiver 106 for each $F_j(t)$, which are agreed upon by the transmitter or transceiver 104 and receiver or transceiver 112 in an exemplary embodiment. Techniques familiar in the art can be used to do this. For instance, if it is agreed to use four functions, the following binary codes may be used:

"j=0" means "00"
"j=1" means "01"
"j=2" means "10"
"j=3" means "11"

In the same exemplary embodiment, $\{F_j(t)\}$ may then be mapped to channel-specific waveforms. $\{F_j(t)\}$ is based on $\{f_m(t)\}$, as discussed above. For example, $\{F_j(t)\}$ may be mapped to the particular units and constraints of the communication channel 110.

In the same exemplary embodiment, the transmitter or transceiver 104 may then encode and transmit a binary sequence. Using binary codes, for example, the binary codes described above, a binary sequence may be converted into an equivalent sequence of functions selected from $\{F_j(t)\}$. With the mapping as discussed above, electromagnetic waveforms can be transmitted, from time corresponding to t=0 to a time corresponding to t=T. If minimizing frequency spread is an issue, a decay function with matching frequency could be used to smoothly return the channel to its initial conditions in preparation for the next signal.

In the same exemplary embodiment, the receiver or transceiver 112 may sample the transmitted waveforms and determine which "j" was sent by look-up in a pre-computed table of values for $\{F_j(t)\}$. The transmitted waveform 108 can be decoded by the processor of the receiver 114 from the relationship between the "j" values and binary sequences.

If noise increases or decreases uniformly in the channel 110 the change in noise may be addressed by respectively increasing or decreasing the value of T. Increasing T may provide greater noise resistance at the expense of lengthening signal durations and possibly reducing the number of signals that are possible in the given channel amplitude and frequency range. If T decreases, the signal may be more susceptible to noise, but more signals within the same channel amplitude and frequency range may be supported. If noise changes non-uniformly, adjusting T may still improve performance. However, a better result may be possible by reselecting $\{F_j(t)\}$ for the new conditions of the channel 110.

Generally referring to FIG. 2, as previously discussed, each $f_m(t)$ may determine a circle of unique radius in the complex plane, for particular values of m and t. With greater separation between these circles, the noise-resistance for communication may be greater. If the desired separation between curve amplitudes is known in terms of successive ratios, signal functions $\{F_j(t)\}$ may be selected from $\{f_m(t)\}$ and a t=T may be selected such that the ratio of radii for successive $F_j(t)$ exactly matches the desired amplitude ratios. This procedure does not require the successive ratios or offsets to be the same.

If $\|F_j(t)\|$ is the length of the radius of $F_j(t)$ in the complex plane and $r_j$ is the desired signal amplitude ratio between $F_j(t)$ and $F_{j+1}(t)$, then $F_j(t)$, $F_{j+1}(t)$ and T may be chosen such that:

$$\|F_{j+1}(T)\| / \|F_j(T)\| = r_j$$

since the radius of $f_m(t)$ may be:

$$\|f_m(t)\| = e^{t \cdot \cos(2^{1-m} \cdot \pi)}$$

The ratio of the first two circle radii may be:

$$\|F_1(T)\|/\|F_0(T)\|=\|f_{m_b}(T)\|/\|f_{m_a}(T)\|=e^{T\cdot\cos(\pi\cdot 2^{1-m_b})-T\cdot\cos(\pi\cdot 2^{1-m_a})}=r_0$$

$F_0(t)$ may be picked from any $f_m(t)$. The subsequent functions may then be determined in terms of this choice. As a result, it may be assumed that $F_0(t)$ and consequently $m_a$ are known. Solving for $m_b$, then, may determine $f_{m_b}(T)$, and hence $F_1(t)$ may also be determined.

Taking the natural logarithm of the previous equation yields:

$$T\cdot\cos(\pi\cdot 2^{(1-m_b)})-T\cdot\cos(\pi\cdot 2^{(1-m_a)})=\ln(r_0)$$

Performing further algebraic simplification:

$$\cos(\pi\cdot 2^{(1-m_b)})=\cos(\pi\cdot 2^{(1-m_a)})+\frac{\ln(r_0)}{T}$$

$$m_b = 1 - \log_2\left(\frac{\cos^{-1}\left(\cos(\pi\cdot(2^{(1-m_a)}))+\frac{\ln(r_0)}{T}\right)}{\pi}\right)$$

$F_0(t)$ is not required to be a particular function, although the choice of $F_0(t)$ may affect the determination of all subsequent $F_j(t)$. Additionally, T may have variable values. The ratios $r_j$ may determine the relationships between the $F_j(t)$, but not the overall amplitude of the sequence as a whole. T may be picked to fit the amplitude range of the particular channel 110. For m>2, amplitude may increase with increasing T. The m-values determined by this procedure may be real numbers. The algorithm may produce a signal separation no smaller than specified by the $r_j$. In practice, the separation may be larger.

Below is an example that is only used to demonstrate how a particular calculation could be worked through. This example describes a specific case for an exemplary embodiment:

Suppose that one is required to find three functions $F_0(t)$, $F_1(t)$ and $F_2(t)$, with amplitude ratios $r_0=1.2$ and $r_1=2.8$. As discussed, there is a free choice of $F_0(t)$ and T based on overall channel considerations. Assume that $F_0(t)=f_{2.1}(t)$ and $T=1.5$ are selected, then $m_b$ is:

$$m_b = 1 - \log_2\left(a\cos\left(\cos(\pi\cdot 2^{1-m_a})+\frac{\ln(r_0)}{T}\right)/\pi\right)$$

$$m_b = 1 - \log_2\left(a\cos\left(\cos(\pi\cdot 2^{1-2.1})+\frac{\ln(1.2)}{1.5}\right)/\pi\right)$$

$$m_b = 2.23$$

As a check:

$$\|F_1(T)\|/\|F_0(T)\| = e^{T\cdot\cos(\pi\cdot 2^{1-m_b})-T\cdot\cos(\pi\cdot 2^{1-m_a})}$$
$$= e^{1.5\cdot\cos(\pi\cdot 2^{1-2.23})-1.5\cdot\cos(\pi\cdot 2^{1-2.1})}$$
$$= 1.2$$

$m_c$ can be found by repeating the procedure:

$$m_c = 1 - \log_2\left(a\cos\left(\cos(\pi\cdot 2^{1-m_b})+\frac{\ln(r_1)}{T}\right)/\pi\right)$$

$$m_c = 1 - \log_2\left(a\cos\left(\cos(\pi\cdot 2^{1-2.23})+\frac{\ln(2.8)}{1.5}\right)/\pi\right)$$

$$m_c = 3.9$$

Again, this can be checked:

$$\|F_2(T)\|/\|F_1(T)\| = e^{T\cdot\cos(\pi\cdot 2^{1-m_c})-T\cdot\cos(\pi\cdot 2^{1-m_b})}$$
$$= e^{1.5\cdot\cos(\pi\cdot 2^{1-3.9})-1.5\cdot\cos(\pi\cdot 2^{1-2.23})}$$
$$= 2.8$$

If desired, the signals may also be separated by frequency ratios or offsets instead of amplitude. This can be done utilizing the second factor of:

$$f_m(t)=e^{t\cdot\cos(2^{1-m}\cdot\pi)}\cdot e^{j\cdot t\cdot\sin(2^{1-m}\cdot\pi)}$$

rather than the first factor.

Separations in the combined frequency/amplitude space may also be specified. For example, this can be done using the distance formula:

$$\sqrt{\cos(2^{1-m}\cdot\pi)^2+\sin(2^{1-m}\cdot\pi)^2}$$

If the desired signal separations are known in terms of offsets, instead of ratios, the calculation may instead be performed by first translating the offsets into equivalent ratios and then applying the technique explained previously.

Given:

$$F_{j+1}(t)=F_j(t)+\alpha$$

The equivalent r such that $$F_{j+1}(t)=r\cdot F_j(t)$$

is $$r=(F_j(t)+\alpha)/F_j(t)$$

"Cairns space" can refer to the complex nonlinear mathematical functions described above. Referring to FIG. 1, the processor of the transmitter 106 in exemplary embodiments may also translate from signal space into Cairns space, in which curves with the desirable qualities described previously may be generated with less difficulty. Translation back to signal space may then occur. For example, the mapping from signal space frequency to the m parameter in Cairns space may be nonlinear. Frequency may vary with $\sin(2^{1-m}\cdot\pi)$ in Cairns space.

While the mapping between signal duration and t can be linear and the mapping between signal amplitude and curve amplitude in Cairns space can be linear, the interaction between these two may be nonlinear. A variation in t may produce an exponential amplitude change.

A first step of developing a signal-space-to-Cairns-space equivalency for a given channel can be to map the signal duration units to a corresponding scale of the Cairns space t parameter. This can then be used to map the signal space frequency range boundaries to corresponding limits on the Cairns space parameter m.

Figure 3:
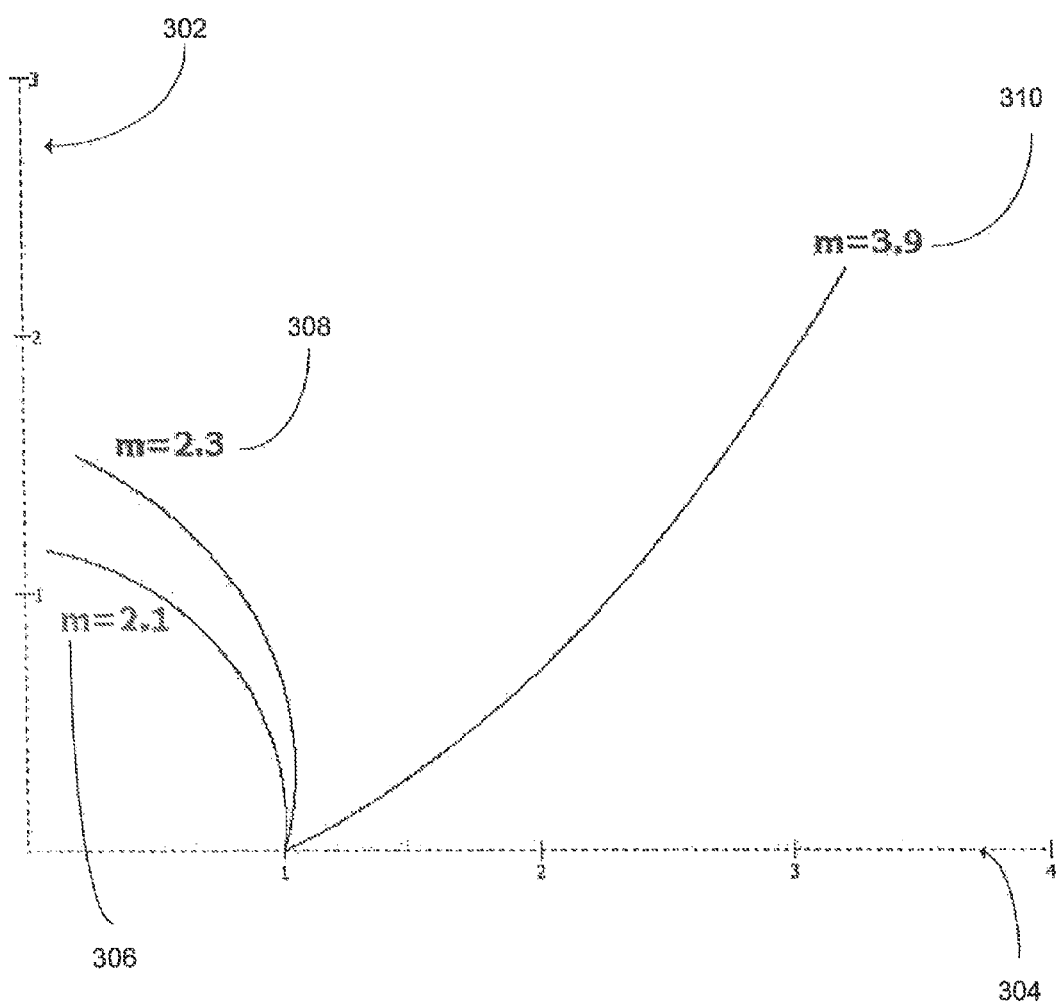
FIG. 3 is an exemplary graph of sample signals engineered to be separated by specified amplitude ratios according to an exemplary embodiment.

In exemplary FIG. 3, a graph 300 with an imaginary y-axis 302 and a real x-axis 304 is depicted. In Cairns space, m may control both the frequency and the growth rate of a spiral. Higher values of m can correspond to lower frequency and higher growth rate. A value of m=2 corresponds to the Euler circle in the complex plane. Referring to exemplary FIG. 3, values of m>2, such as the curves depicted in 306, 308, and 310, correspond to increasing spirals.

In an exemplary embodiment, signals may correspond to increasing spirals in the complex plane. The signal frequency range may then be mapped to Cairns space m values greater than two.

In a further exemplary embodiment, the lower m value (called $m_a$) may be chosen arbitrarily to be any real number greater than 2. For instance, $m_a$=2.1.

Referring back to exemplary FIG. 1, once $m_a$ is defined, the units of t and the upper m value (called $m_b$) may be uniquely determined by the parameters of the channel 110 by a technique that may be called, for example, "equality of angular distance."

Still referring to FIG. 1, in one manner of generating an accurate map between signal space and Cairns space, the highest frequency allowed by the channel 110 may need to map to $m_a$, and the map from a signal duration "d" to the equivalent Cairns parameter "t" may be such that the angular distance is consistent between the two systems:

$$f_{max} \cdot d = \sin(2^{1-m_a} \cdot \pi) \cdot \frac{t}{2\pi}$$

If we assume that $f_{max}$ and $m_a$ are given and that d and t have corresponding zero values, the above equation may be sufficient to determine a linear relationship between d and t. This in turn may allow $m_b$ to be determined from the equation:

$$f_{min} \cdot d = \sin(2^{1-m_b} \cdot \pi) \cdot \frac{t}{2\pi}$$

This is in part due to the fact that a signal and its corresponding Cairns curve may agree on the angular distance traveled.

Solving for $m_b$ yields:

$$m_b = 1 - \log_2\left(\frac{a\sin\left(\frac{2\pi \cdot f_{min} \cdot d}{t}\right)}{\pi}\right)$$

In the amplitude map between signal space and Cairns space, for Cairns space, m and t may uniquely define amplitude, through the factor $e^{t \cdot \cos(2^{1-m} \cdot \pi)}$. However, in signal space frequency, duration and amplitude may be independent variables. Therefore, an additional constraint may specify the correspondence between signal space and Cairns space amplitudes.

The amplitude map may be done in any of a variety of ways. In an exemplary embodiment, a convenient amplitude mapping method may proceed as follows:
1. In signal space, center the available amplitude range around zero.
2. Define a signal space "noise distance" based on the estimated average amplitude noise.
3. Define a corresponding "noise distance" in Cairns space. For instance, one can define the amplitude difference $e^{t_2 \cdot \cos(2^{1-m} \cdot \pi)} - e^{t_1 \cdot \cos(2^{1-m} \cdot \pi)}$ to be equivalent to the average amplitude noise in signal space, for some $t_2 > t_1$ and some m.
4. Define a linear amplitude map between signal space and Cairns space using their respective noise distances, with the line passing through zero.

In an exemplary embodiment, the choice of $t_2$ and $t_1$ may be determined by sampling considerations. The difference $t_2 - t_1$ corresponds to the time it takes a Cairns curve (or the corresponding signal) to increase in amplitude through one noise interval when starting at amplitude $e^{t_1 \cdot \cos(2^{1-m} \cdot \pi)}$. How long this should take may be determined by how many samples one can or wants to record during this transition.

There is also freedom in the selection of m in the amplitude map. In an exemplary embodiment, a choice may be:

$$m = (m_b - m_a)/2$$

Given the mapping between signal space and Cairns space established here, any Cairns curve with m value $m_b > m > m_a$ and appropriate amplitude range may be converted to a signal that is consistent with channel frequency and amplitude range parameters. Within these confines, curves may be generated in Cairns space with the properties described above.

In one exemplary embodiment, a signal may correspond to a growing spiral in the complex plane, starting at the point (1,0).

In another exemplary embodiment, the x and y components in the complex plane can be transmitted simultaneously.

Referring to FIG. 1, depending on an application, waveforms 108 transmitted may be designed to be distinguishable from each other by a combination of their frequency, peak amplitude, time duration to peak amplitude, phase, and their direction of rotation in the complex plane. Combinations of these parameters may also be used to redundantly encode the same information, for noise resistance or other uses.

A phase shift in Cairns space can be equivalent to starting a curve at a value t>0. While it is possible to convey information through phase, it should be noted that doing so may create an extra burden on the receiver or transceiver 104. With variable phase, the receiver or transceiver 112 may not count on knowing the intended initial amplitude to measure noise and to anchor the reading of the exponential curve.

Generally referring to the data transmission of FIG. 1, for a signal definition strategy for sending a waveform 108 an exemplary embodiment may include the steps of separating signals by specified amplitude, frequency, or combined amplitude-frequency distance in the complex plane, as described above.

In an exemplary embodiment, it may be possible to define signals in "frequency bands" having the same m-value but distinguished by their peak amplitude. Doing so for all m-values having frequencies within the allowable channel frequency range, with appropriate noise margins, may provide a method to completely and unambiguously cover the available amplitude-frequency signal space.

Referring to FIG. 1, the waveform 108 for the above described exemplary embodiment may have higher peak amplitude for a given frequency and may be generated by extending t for the corresponding Cairns curve.

In another exemplary embodiment utilizing the "frequency bands" approach, the signal-generating equation may be generalized to include a signal-dependent amplitude constant $k_s$:

$$f_m(t) = k_s \cdot e^{t \cdot \cos(2^{1-m} \cdot \pi)} e^{i \cdot t \cdot \sin(2^{1-m} \cdot \pi)}$$

Here, increasing $k_s$ for signals with higher peak amplitude may allow all signals to reach their peak amplitude in exactly the same time period. Also, doing so may reduce noise resistance by removing the redundancy between frequency and amplitude growth rate.

In an exemplary embodiment, the processor of the transmitter or transceiver 106 and the processor of the receiver or transceiver 114 may define signals in terms of cosine and sine components. With QAM, the superimposed sum of these components may be transmitted together, then separated or demodulated by the receiver or transceiver 112. The separation method may be based on reconstructing the combined waveform from many samples and measuring that waveforms phase and amplitude. The phase calculation for QAM may require accurate clock synchronization.

Referring to FIG. 1, exemplary embodiments may make possible an equivalent of the QAM superposition technique, although it may be more efficient to transmit the sine and cosine components of the signals separately. A single paired sample of the cosine and sine components transmitted separately may be sufficient to uniquely determine the signal's m-value and, consequently, its frequency and amplitude growth rate.

Still referring to FIG. 1, a method for determining a signal's m-value as discussed above, as used in some exemplary embodiments, may be as follows. Let X be the real (cosine) signal value measured by the receiver or transceiver 104 at signal duration d, and let Y be the corresponding imaginary (sine) value. The method may start by translating these to the corresponding values in Cairns space, x, t, and y, using the maps described above. As shown previously, it is known that $$x = e^{t \cdot \cos(2^{1-m} \cdot \pi)} \cdot \cos(\sin(2^{1-m} \cdot \pi)t)$$

$$y = e^{t \cdot \cos(2^{1-m} \cdot \pi)} \cdot \sin(\sin(2^{1-m} \cdot \pi)t)$$

for unknown m.

The value of m may be found by summing the squares of x and y to remove the cosine and sine factors, then pulling m out of the exponential factor. For example:

$$x^2 + y^2 = e^{2t \cdot \cos(2^{1-m} \cdot \pi)}$$

which implies $$m = 1 \log_2(a \cos(\log(x^2+y^2)/2t)/\pi)$$

In situations where t may not be reliably known (because of poor clock synchronization, or because information is stored in signal phase, implying variation in the starting value of t, for example), the same approach can work, but may use two samples instead of one. By standard algebraic elimination, two equations allow for solving for two unknowns. Two samples give two linked equations involve t and m, thereby allowing us the resolution of both t and m.

For example, suppose that the receiver or transceiver takes two measurements, corresponding to times t and t+c, where t is not known precisely. Assume that the amplitudes are measured:

$$A_1^2 = x_1^2 + y_1^2 = e^{2t \cdot \cos(2^{1-m} \cdot \pi)}$$

$$A_2^2 = x_2^2 + y_2^2 = e^{2(t+c) \cdot \cos(2^{1-m} \cdot \pi)}$$

Then t can be solved for by eliminating m, as follows $$\log(A_1^2) = 2t \cdot \cos(2^{1-m} \cdot \pi)$$

$$\log(A_2^2) = 2(t+c) \cdot \cos(2^{1-m} \cdot \pi)$$

Removing a factor of two gives $$\log(A_1) = 2t \cdot \cos(2^{1-m} \cdot \pi)$$

$$\log(A_2) = (t+c) \cdot \cos(2^{1-m} \cdot \pi)$$

Equate through the common factor to get $$\frac{\log(A_1)}{t} = \frac{\log(A_2)}{t+c}$$

$$(t+c) \cdot \log(A_1) = t \cdot \log(A_2)$$

$$t = -c \cdot \log(A_1)/(\log(A_1) - \log(A_2))$$

$$t = c \cdot \log(A_1)/(\log(A_2) - \log(A_1))$$

After which m may be found as described above.

Referring to FIG. 1, some embodiments may utilize the phase for communication. This may be equivalent to specifying that the signal does not start at t=0 but instead at t=$t_0$, for $t_0$ that varies between signals and must be deduced by the receiver or transceiver 106. The receiver or transceiver 106, may be able to find $t_0$ as described in an exemplary embodiment.

The calculation of m from t given above may be independent of phase. (Since initially $t_0$ may not be known, t is also not known, and therefore at least two samples may be necessary as described above). Once m has been found, the phase can be calculated based on the first sample recorded from the signal as follows:

$$x_0 = e^{t_0 \cdot \cos(2^{1-m} \cdot \pi)} \cos(\sin(2^{1-m} \cdot \pi)t_0)$$

$$y_0 = e^{t \cdot \cos(2^{1-m} \cdot \pi)} \sin(\sin(2^{1-m} \cdot \pi)t_0)$$

Since phase may be relevant, one can remove amplitude information by taking the ratio of these equations, yielding a tangent:

$$\frac{y_0}{x_0} = \tan(\sin(2^{1-m} \cdot \pi) \cdot t_0)$$

And therefore phase $t_0$ is given by $$t_0 = a\tan\left(\frac{y_0}{x_0}\right) / \sin(2^{1-m} \cdot \pi)$$

As detailed above, in an exemplary embodiment of the present invention, the transmitter 106 of FIG. 1 can transmit the cosine and sine components of a signal separately. However, if so desired it may be possible to also transmit the superimposed cosine and sine components of a signal of the present invention and for the receiver or transceiver to deduce the value of m using a method similar to that used in QAM.

In superposition, each signal sample measured by the receiver or transceiver can correspond to an instance of $$w = e^{t \cdot \cos(2^{1-m} \cdot \pi)}(\cos(\sin(2^{1-m} \cdot \pi)t) + \sin(\sin(2^{1-m} \cdot \pi)t))$$

Using trigonometric identities, this is equivalent to $$w = e^{t \cdot \cos(2^{1-m} \cdot \pi)} \sqrt{2}((1/\sqrt{2})(\cos(\sin(2^{1-m} \cdot \pi)t) + (1/\sqrt{2})\sin(\sin(2^{1-m} \cdot \pi)t))$$

$$w = \sqrt{2} e^{t \cdot \cos(2^{1-m} \cdot \pi)}(\sin(\pi/4)\cos(\sin(2^{1-m} \cdot \pi)t) + \cos(\pi/4)\sin(\sin(2^{1-m} \cdot \pi)t))$$

$$w = \sqrt{2} e^{t \cdot \cos(2^{1-m} \cdot \pi)} \sin(\sin(2^{1-m} \cdot \pi)t + \pi/4)$$

The frequency can be determined from samples of w, in the limit, by counting zero crossings, from which m can be calculated.

For explanatory purposes, the superposition technique described above may now be compared with the superposition technique of QAM. In the superposition technique of QAM, the frequency can be known (because only one frequency may be used) but the phase may not (because it can depend on the relative weighting of the cosine and sine terms). In the case of the technique described above, the phase may be known (because the cosine and sine terms have the same weighting and we assume $t_0$=0) but the frequency may not be known (because the present invention may use the entire available frequency spectrum).

Exemplary embodiments may also make use of the following strategy for signal reception and decoding:
1. Sample the electromagnetic waveform corresponding to a transmitted signal.
2. Determine its m-value.
3. Depending on how signals are defined for the particular channel, determine the signal's peak amplitude, frequency, signal duration, and/or phase.
4. Based on these values, look up the signal's corresponding numeric sequence in a table.

An exemplary embodiment may further provide for the use of combinations of signal parameters for error detection. The equation $$f_m(t) = e^{t \cdot \cos(2^{1-m} \cdot \pi)} e^{i \cdot t \cdot \sin(2^{1-m} \cdot \pi)}$$

can imply that any two out of three of amplitude ($f_m(t)$), signal duration (t) and frequency (determined from m) can uniquely determine the third. Depending on the characteristics of the signal set in use, stronger constraints may also be possible, such as:
1. All signals reach their peak amplitude after the same duration.
2. Amplitude growth rate and frequency uniquely determine each other through the parameter m. (This will be true unless a modification such as the $k_s$ factor, described above, is introduced.)
3. All signals have the same phase (corresponding to starting at t=0).

For the exemplary embodiments using nonlinear power amplification, the signals generated from Cairns curves could be used to control for amplitude distortion in two key ways.
1. The amplitude of every Cairns curve starts at known amplitude and increases exponentially. Any deviation from an exponential curve is easily detected and measurable.
2. For a Cairns curve, amplitude growth and frequency are defined uniquely by the same m parameter. Since frequency is not affected by amplitude distortion (it depends only on zero crossings) frequency can be used as a check and measure for amplitude distortion.

Unlike digital and many analog techniques, signals of embodiments disclosed herein may correspond to a single frequency. Signals of exemplary embodiments with varying amplitude signals may induce minimal frequency spread as long as, after signal termination, the channel is returned to its original amplitude with a "decay function" that has the same frequency as the signal. Consequently, these embodiments may allow communication to occur with minimal frequency spread beyond the frequencies used for communication.

Figure 4:
FIG. 4 is an exemplary chart showing the different kinds of spirals that exemplary embodiments may form in the complex plane.

Referring now to exemplary FIG. 4, a chart 400 may describe a relationship between a range of m 402 and the sign of a term $\cos(2^{1-m} \cdot \pi)$ 404, the sign of a term $\sin(2^{1-m} \cdot \pi)$ 406, and a spiral rotation direction 408 for exemplary embodiments. The chart 400 is discussed below for illustrative purposes. For t>0, the equation:

$$f_m(t) = e^{t \cdot \cos(2^{1-m} \cdot \pi)} e^{i \cdot t \cdot \sin(2^{1-m} \cdot \pi)}$$

can define an increasing spiral if the factor $\cos(2^{1-m} \cdot \pi)$ is positive, and a shrinking spiral if this factor is negative. Similarly, the spiral may rotate in the counter-clockwise direction if the factor $\sin(2^{1-m} \cdot \pi)$ is positive, and in the clockwise direction if this factor is negative.

Since the cosine function changes sign at $\pi/2$ and $3\pi/2$, and the sine function changes sign at 0 and $\pi$, it may be possible to build the table in FIG. 4 for t>0.

Previously, signals with m>2 were discussed. However, the table in FIG. 4 shows that signals with $2-\log_2(3)$>m>0 may have the same desirable features previously discussed, differing only in the direction of rotation. Therefore, by using both the region m>2 and the region $2-\log_2(3)$>m>0, the set of possible signals may be doubled.

If desired, for a given increasing spiral with counter-clockwise rotation, a spiral with clockwise rotation that has the same rate of increase may be found. To do so, let $m_a$>2 be an increasing counter-clockwise spiral, and let $2-\log_2(3)$>$m_b$>0 be the clockwise spiral with the same growth rate. Then, $\cos(2^{1-m_a} \cdot \pi) = \cos(2^{1-m_b} \cdot \pi)$, with the given range constraints on $m_a$ and $m_b$.

A way to think about this problem is that $2^{1-m_a}\pi$ can differ from $\pi/2$ by the same amount that $2^{1-m_b}\pi$ differs from $3\pi/2$, but with opposite sign. This yields:

$$\frac{\pi}{2} - (2^{1-m_a} \cdot \pi) = (2^{1-m_b} \cdot \pi) - 3\pi/2$$

which can be solved to yield $$m_b = 1 - \log_2(2 - 2^{1-m_a})$$

Embodiments discussed herein may have the potential to convey very high information densities which may be due to the use of nonlinear functions. This information density may be significantly higher than is possible using traditional means.

Figure 5:
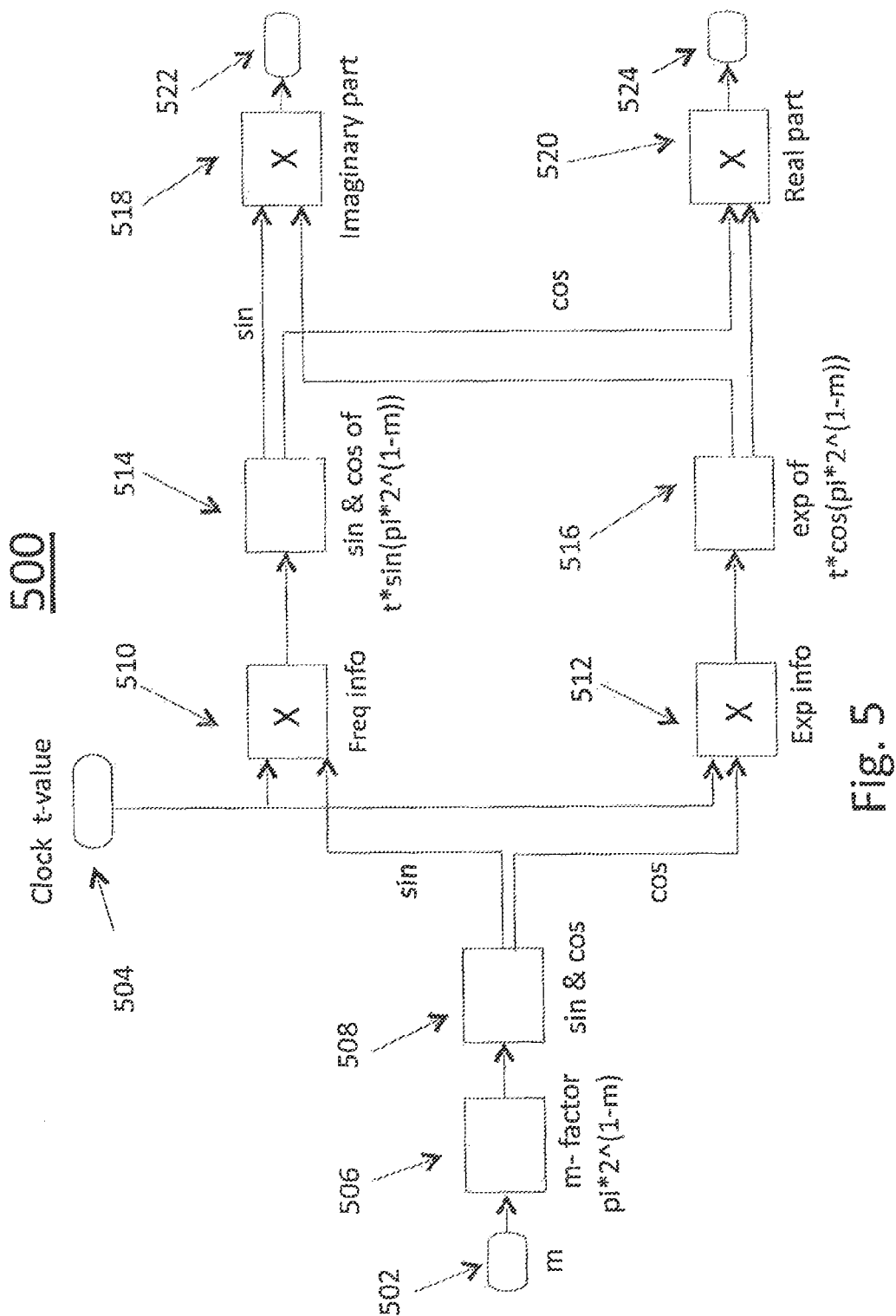
FIG. 5 is an exemplary functional diagram which may generate waveforms according to an exemplary embodiment.

Referring to FIG. 5, a functional diagram 500 describes how the waveforms may be generated in an exemplary embodiment. The functional diagram 500 constructs the waveform generating equation:

$$f_m(t) = e^{t \cdot \cos(2^{1-m} \cdot \pi)} \cdot (\cos(t \cdot \sin(2^{1-m} \cdot \pi)) + i \cdot \sin(t \cdot \sin(2^{1-m} \cdot \pi)))$$

which is separated into real and imaginary parts.

Still referring to FIG. 5, the input for the function depicted in functional diagram 500 may include an m-value input block 502 and a t-value input block 504. The m-value input block 502 may feed into a function block 506 which may use the m-value input block 502 as input. A weighting block 508 may provide a weight for the frequency information and a different weight for the exponential information using the output of the function block 506. These weights may be multiplied by the t from the t-value input block 504 using multiplication operator blocks 510 and 512. In another exemplary embodiment, the weighting block 508 and the multiplication operator blocks 510 and 512 may, for a production system, take the form of variable resistors. The output of multiplication operator block 510 may be used as input to the function block 514. The output of the multiplication operator block 512 may be used as input to the function block 516. The output of the function blocks 514 and 516 may be then divided into a real part and an imaginary part. The imaginary part may be extracted using multiplication block 518. The real part may be extracted using a multiplication block 520. The above described operations may result in an imaginary output 522 and a real output 524.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for communicating, comprising:
   identifying a set of nonlinear functions used to generate waveforms;
   assigning a unique numeric code to each of said waveforms;
   transmitting a numeric sequence as a series of said waveforms;
   receiving the series of said waveforms; and,
   decoding the series of said waveforms,
   wherein the nonlinear functions are used to represent at least one of increasing and decreasing spirals in a complex plane, and said spirals are used to generate waveforms corresponding to the cosine and sine components of said spirals, and these cosine and sine components are transmitted through a communication channel;
   wherein each waveform is distinguished from other waveforms by at least one of amplitude, frequency, phase, signal duration, and direction of rotation.

2. The method of claim 1, further comprising:
   compensating for nonlinear power amplification to control for amplitude distortion by at least one of detecting and measuring a deviation from an exponential curve, and checking and measuring frequency against amplitude distortion.

3. The method of claim 1, further comprising:
   distinguishing waveforms by whether said spirals are increasing or decreasing, and rotating in the clockwise or counter-clockwise direction.

4. The method of claim 1, further comprising:
   compensating for clock synchronization at a receiver by taking at two measurements of time, t, and using two equations with a second unknown variable and solving for t.

5. The method of claim 1, further comprising:
   calculating unknown phase information in a receiver.

6. The method of claim 1, further comprising:
   using combinations of waveform parameters and redundant information to calculate for errors in a receiver.

7. The method of claim 1, further comprising:
   establishing said spirals such that no spirals intersect at the same value of time, t.

8. The method of claim 1, further comprising:
   selecting a new set of functions based on new conditions of the communication channel.

9. The method of claim 1, further comprising:
   utilizing a decay function to return the channel to an initial condition to reduce a frequency spread.

10. The method of claim 1, further comprising:
    separating waveforms by at least one of amplitude ratio, frequency ratio, distance ratio, or by offsets.

11. The method of claim 1, further comprising:
    distinguishing waveforms by at least one of a combination of their frequency, peak amplitude, time duration to peak amplitude, phase, direction of rotation in the complex plane, and frequency bands.

12. The method of claim 1, further comprising:
    creating a map between a waveform space and Cairns space.

13. The method of claim 1, further comprising:
    determining a waveform's m value by a receiver, by using real and imaginary waveform values X and Y measured by the receiver at waveform duration d,
    translating these to corresponding values in Cairns space, x, t, and y,
    wherein
    $$x = e^{t \cdot \cos(2^{1-m} \cdot \pi \cdot)} \cdot \cos(\sin(2^{1-m} \pi \cdot)t); \text{ and}$$
    $$y = e^{t \cdot \cos(2^{1-m} \cdot \pi \cdot)} \cdot \sin(\sin(2^{1-m} \cdot \pi)t)$$
    for unknown m; and
    summing the squares of x and y to remove the cosine and sine factors.

14. The method of claim 1, further comprising:
    adjusting a maximum value of time, T, to alter at least one of noise resistance and communication speed.

15. The method of claim 1, further comprising:
    adjusting a maximum value of time, T, to account for changing channel conditions.

16. The method of claim 1, further comprising:
    using at least one repeater to strengthen said waveforms.

17. The method of claim 1, further comprising:
    transmitting the superimposed cosine and sine components of a waveform; and
    deducing the value of m at a receiver.

18. A system for communicating, comprising:
    means for identifying a set of nonlinear functions used to generate waveforms;
    means for assigning a unique numeric code to each of said waveforms;
    means for transmitting a numeric sequence as a series of said waveforms;
    means receiving the series of said waveforms; and,
    means decoding the series of said waveforms,
    wherein the nonlinear functions are used to represent at least one of increasing and decreasing spirals in a complex plane, and said spirals are used to generate waveforms corresponding to the cosine and sine components of said spirals, and these cosine and sine components are transmitted through a communication channel.

19. The system of claim 18, further comprising:
    means for compensating for nonlinear power amplification to control for amplitude distortion by at least one of detecting and measuring a deviation from an exponential curve, and checking and measuring frequency against amplitude distortion.

20. The system of claim 18, further comprising:
    means for distinguishing waveforms by whether said spirals are increasing or decreasing, and rotating in the clockwise or counter-clockwise direction.

* * * * *